US009221048B2

(12) United States Patent
Duquet et al.

(10) Patent No.: US 9,221,048 B2
(45) Date of Patent: Dec. 29, 2015

(54) DROPPER DISPENSER

(75) Inventors: Frédéric Duquet, Crespieres (FR); Sandra Martins-Reis, Meudon (FR); Francis Moreau, Sotteville les Rouen (FR)

(73) Assignee: APTAR FRANCE SAS, Le Neubourg (FR)

( * ) Notice: Subject to any disclaimer, the term of this patent is extended or adjusted under 35 U.S.C. 154(b) by 279 days.

(21) Appl. No.: 14/009,699

(22) PCT Filed: Apr. 5, 2012

(86) PCT No.: PCT/FR2012/050740
§ 371 (c)(1),
(2), (4) Date: Oct. 3, 2013

(87) PCT Pub. No.: WO2012/136938
PCT Pub. Date: Oct. 11, 2012

(65) Prior Publication Data
US 2014/0020789 A1    Jan. 23, 2014

(30) Foreign Application Priority Data
Apr. 7, 2011   (FR) .................................. 11 53040

(51) Int. Cl.
*B01L 3/02*   (2006.01)
*A45D 34/04*   (2006.01)
*B65D 47/18*   (2006.01)

(52) U.S. Cl.
CPC ............... *B01L 3/0272* (2013.01); *A45D 34/04* (2013.01); *B65D 47/18* (2013.01); *A45D 2200/056* (2013.01)

(58) Field of Classification Search
CPC ..................................... B65D 47/18
USPC ....................... 141/23–27; 604/212
See application file for complete search history.

(56) References Cited

U.S. PATENT DOCUMENTS

| 694,530 A | * | 3/1902 | Comer | .................... G01F 19/00 |
| | | | | 116/227 |
| 2,595,493 A | * | 5/1952 | Slaby | ...................... B01L 3/021 |
| | | | | 141/24 |

(Continued)

FOREIGN PATENT DOCUMENTS

FR    2 549 015 A   1/1985
WO   94/18526 A1   8/1994

OTHER PUBLICATIONS

English translation of the International Preliminary Report on Patentability for PCT/FR2012/050740.

*Primary Examiner* — Timothy L Maust
(74) *Attorney, Agent, or Firm* — Sughrue Mion, PLLC (57) ABSTRACT

A drop dispenser including a fluid reservoir, a tube having a dispenser end and an actuation end, a fluid chamber of variable volume connected to the actuation end of the tube; a pusher that is axially movable between a high position and a low position so as to cause the volume of the chamber to vary and drive the fluid into the tube towards the dispenser end so as to form a drop of fluid; and a fastener ring including a threaded skirt for coming into engagement with the threaded neck, the tube and the chamber being secured to the ring. The drop dispenser have a mover for moving the pusher axially between the high and low positions, the mover also causing the fastener ring to turn, both so as to loosen it from the neck by unscrewing and so as to tighten it onto the neck by screw-tightening.

12 Claims, 4 Drawing Sheets

(56) References Cited

U.S. PATENT DOCUMENTS

| | | | | |
|---|---|---|---|---|
| 3,020,938 A | * | 2/1962 | Ballin | B01L 3/0282 141/24 |
| 4,573,503 A | * | 3/1986 | Bruhn | B43L 25/00 141/24 |
| 4,579,153 A | | 4/1986 | Goncalves | |
| 4,955,745 A | | 9/1990 | Vauquelin | |
| 5,154,702 A | * | 10/1992 | Foyil | B01L 3/0282 215/214 |
| 5,226,572 A | * | 7/1993 | Gargione | B01L 3/0272 141/24 |
| 5,614,172 A | | 3/1997 | Geimer | |
| 8,403,008 B2 | * | 3/2013 | Bouix | A45D 34/04 141/23 |

* cited by examiner

DROPPER DISPENSER

CROSS REFERENCE TO RELATED APPLICATIONS

This application is a National Stage of International Application No. PCT/FR2012/050740, filed on Apr. 5, 2012, which claims priority from French Patent Application No. 1153040, filed on Apr. 7, 2011, the contents of all of which are incorporated herein by reference in their entirety.

The present invention relates to a dispenser of the dropper type that makes it possible to dispense a fluid in drop form. The drops are dispensed one after another. The drop(s) fall from the dispenser by gravity onto a desired application surface. Advantageous fields of application of the present invention are the fields of perfumery, cosmetics, and pharmacy.

In the prior art, drop dispensers are already known for dispensing fluids, such as medication, lotions, oils, and more recently serums in the fields of cosmetics and pharmacy. In conventional manner, the drop dispenser comprises a tube that is connected to a flexible part, such as a squeeze bulb that defines a fluid chamber of variable volume. The tube plunges into a fluid reservoir, and squeezing then releasing the bulb makes it possible to fill the chamber by suction through the tube. The tube includes a dispenser end that is configured in such a manner that the fluid present in the chamber and the tube is retained by capillarity. Furthermore, the dispenser end of the tube is designed in such a manner that controlled squeezing of the bulb causes correctly formed drops to be dispensed in succession. The hand action on the drop dispenser is simple: to begin with, the bulb is squeezed and released while the tube is dipped in a fluid reservoir, then the tube and the bulb are removed from the reservoir, and the bulb is squeezed so as to dispense one or more drops of fluid onto a desired application surface. Finally, the tube and the bulb are put back on the fluid reservoir like a stopper. The bulb may be squeezed directly by means of a finger, or, in a variant, the dispenser may include a rigid pusher that may be pressed so as to deform the bulb.

With that type of drop dispenser, it is thus necessary to act beforehand on the bulb so as to fill the dispenser with fluid. If the user omits this prior step, there is the risk of incomplete drops being dispensed, or of fluid being sprayed, given that the chamber may be filled in part with air. This is not really the desired objective, given that the function of the drop dispenser is to dispense well-formed drops.

Consequently, an object of the present invention is to remedy the above-mentioned drawback of the prior art by defining a drop dispenser in which it is guaranteed that the fluid chamber will be filled. Another object of the present invention is to fill the chamber automatically. Still another object of the present invention is to guarantee that the chamber is filled in identical manner on each use. Still another object of the present invention is to simplify the hand action needed on of the drop dispenser. Still another object of the present invention is to prevent any accidental or unintentional actuation of the drop dispenser. Still another object of the present invention is to achieve the above-mentioned objects without adding too many additional parts to the drop dispenser.

To achieve all of these objects, the present invention proposes a drop dispenser comprising: a fluid reservoir having a threaded neck; a tube having a dispenser end that is designed to form a drop of fluid, and an actuation end; a fluid chamber of variable volume, connected to the actuation end of the tube, the chamber being suitable for being filled and emptied through the tube; a pusher that is axially movable between a high position and a low position so as to cause the volume of the chamber to vary and drive the fluid into the tube towards the dispenser end so as to form a drop of fluid; and a fastener ring including a threaded skirt for coming into engagement with the threaded neck of the reservoir, the tube and the chamber being secured to the ring; the drop dispenser being characterized in that it further comprises mover means for moving the pusher axially between the high and low positions, the mover means also causing the fastener ring to turn, both so as to loosen it from the neck by unscrewing and so as to tighten it onto the neck by screw-tightening. By causing the fastener ring to turn so as to loosen it or tighten it, the mover means perform a function that can be said to be neutral in the sense that this does not perform any additional function. However, using tightening and loosening to move the pusher the between the high and low positions presents a significant advantage because moving the pusher axially does not require any hand action other than that of normal tightening and/or loosening. In other words, the axial movement of the pusher results directly from the action of tightening the fastener ring on the neck and of loosening it therefrom. The mover means do not modify the conventional hand action associated with tightening and loosening the fastener ring. The pusher is moved axially without forcing the user to perform a specific operation. The user does not even need to know that tightening the fastener ring causes the pusher to move axially. By means of the axial movement, the pusher modifies the volume of the fluid chamber in controlled and repetitive manner. It is thus guaranteed that the fluid chamber is always filled with the same quantity of fluid. As a result, the user depressing the pusher always has the same effect on the dispensing of drops.

Advantageously, the mover means move the pusher axially from the low position to the high position before the ring is loosened from the neck. This implies that the pusher is in its low position before loosening the ring. In other words, when the dispenser is not used, the pusher is in its low position, corresponding to the minimum volume of the fluid chamber. It is only by loosening the fastener ring that the pusher is moved towards its high position, corresponding to the maximum volume of the fluid chamber. The pusher moves before the ring is loosened from the neck given that, after loosening, the ring is separated completely from the neck, and the mover means can thus no longer act on the pusher. Thus, the user seeking to use the drop dispenser will seek to loosen the ring from the neck, and in so doing will firstly move the pusher towards its high position, and only then actually loosen the ring from the neck. A single hand action makes it possible both to move the pusher and to loosen the ring from the neck, without the user distinguishing clearly the two functions that are performed.

Advantageously, the mover means are mounted to turn relative to the ring over a limited angular stroke over which the pusher is moved axially between the high and low positions by the mover means. In other words, the mover means begin firstly by turning about the ring, then at the end of a limited angular stroke, the mover means are secured to the ring and cause it to turn about the neck. The limited angular stroke corresponds to the stage of moving the pusher axially.

According to another major characteristic, the friction between the mover means and the ring is less than the friction between the ring and the neck, at least at the start of loosening. This is valid during the loosening stage, but not necessarily during the tightening stage. During the loosening stage, it is necessary for the pusher to be moved axially before loosening the ring from the neck. In contrast, during the tightening stage, the pusher may move axially before or after the stage of tightening the ring on the neck. In any event, it is necessary for loosening of the ring from the neck to present resistance that is greater than moving the pusher axially. It is not essential for the friction forces of the ring on the neck necessarily to be greater than the friction forces of the axial movement of the pusher all along the loosening stage, but only at the start of the loosening stage, which may for example correspond to the force necessary for flattening the neck gasket. The compression of the neck gasket generates resistance that is greater than the resistance to axially moving the pusher. However, as soon as the gasket stops being compressed, the friction forces against turning of the ring on the neck may be less than the friction forces against axial movement of the pusher.

In a practical aspect of the invention, the pusher is guided axially relative to the ring while being prevented from turning relative to the ring. In an embodiment, in its high position, the pusher causes the ring to turn so as to loosen it from the neck, and in its high or low position the pusher causes the ring to turn so as to tighten it on the neck. This means that the torque applied to the mover means is transmitted to the fastener ring by means of the pusher. In a variant, the ring and the mover means co-operate with each other to define two angular abutments that define the angular stroke, namely a loosening abutment for driving the ring in the loosening direction while the pusher is already in its high position, and a tightening abutment that is reached when the pusher returns to its low position. In this configuration, the torque applied to the mover means is transmitted directly to the fastener ring by means of the angular abutments. The pusher thus no long serves as means of transmitting torque between the mover means and the fastener ring. However, in the context of the present invention, it can be envisaged to use angular abutments combined with torque being transmitted by the pusher.

In a practical embodiment, the mover means comprise a generally cylindrical bushing that is mounted to turn on the fastener ring over a limited angular stroke, the bushing forming at least one cam path that defines two offset axial ends, the pusher being prevented from turning on the ring and including at least one cam lug that is engaged with the cam path of the bushing, such that turning the bushing relative to the ring causes the cam lug of the pusher to move along the cam path of the bushing between its two axial ends. Advantageously, the bushing extends around the ring and the pusher, the ring and the bushing co-operating with each other to define two angular abutments that limit the angular stroke, the two abutments corresponding substantially to the high and low positions of the pusher, respectively at the start of loosening the ring from the neck, and at the beginning or the end of tightening the ring on the neck. Between the two angular abutments, the cam lug of the pusher moves along the cam path between its two axial ends. The lug may come into abutment against the two axial ends, or, in a variant, the force may be taken up by the angular abutments. In other words, it is not necessary for the torque applied to the bushing to be transmitted to the fastener ring by means of the cam lugs of the pusher.

In another advantageous aspect, the bushing is snap-fastened on the ring while being free to turn about its own axis over an angular stroke that is limited by the angular abutments. Over this limited angular stroke, the pusher is moved axially between its high and low positions.

In another aspect that is conventional, the fastener ring includes a top axial guidance collar that is in axial sliding engagement with the pusher, the bushing comprising a bottom portion that is snap-fastened on the skirt while being free to turn about its own axis over the limited angular stroke, and a top portion that forms said at least one cam path in which the cam lugs of the pusher are engaged.

In another aspect of the invention, the fluid chamber is formed with a flexible part that is deformed by the pusher between the high and low positions, the flexible part advantageously being mounted in the fastener ring. The flexible part may be in the form of a conventional squeeze bulb. Instead of the flexible part, it is also possible to provide a slide cylinder that co-operates with the pusher like a piston so as to cause the volume of the fluid chamber to vary.

A principle of the invention relies on using conventional loosening and tightening operations to move the pusher axially in order to cause the volume of the fluid chamber to vary. This is achieved by means of a single additional part that acts both on the fastener ring so as to cause it to turn, and on the pusher so as to move it axially. It should be observed that the hand action for loosening and tightening remains unchanged, such that the axial movement of the pusher is transparent for the user. By means of the axial movement caused by the pusher, it is possible to cause the volume of the fluid chamber to vary in accurate and repetitive manner. By guiding the pusher to its high position at the start of loosening, the user is guaranteed that the fluid chamber is always filled before use with a predetermined quantity of fluid. There is thus no longer any need to depress the pusher before loosening it. By means of the invention, this operation is now automatic.

The invention is described more fully below with reference to the accompanying drawings, which show an embodiment of the invention by way of non-limiting example.

Figure 1A:
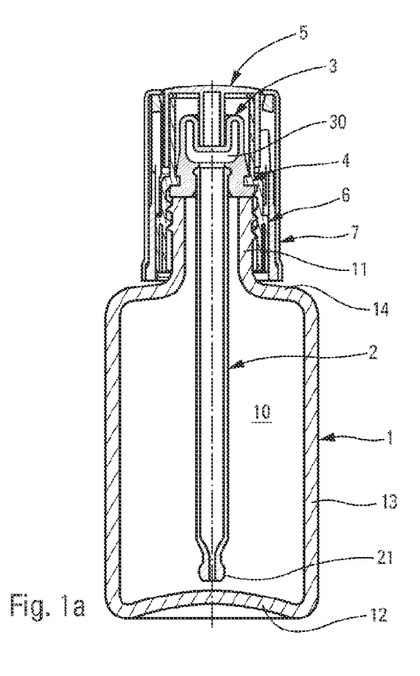
FIGS. 1a and 1b are vertical-section views through a drop dispenser of the invention, respectively in the low and high positions of the pusher.
Figure 1B:
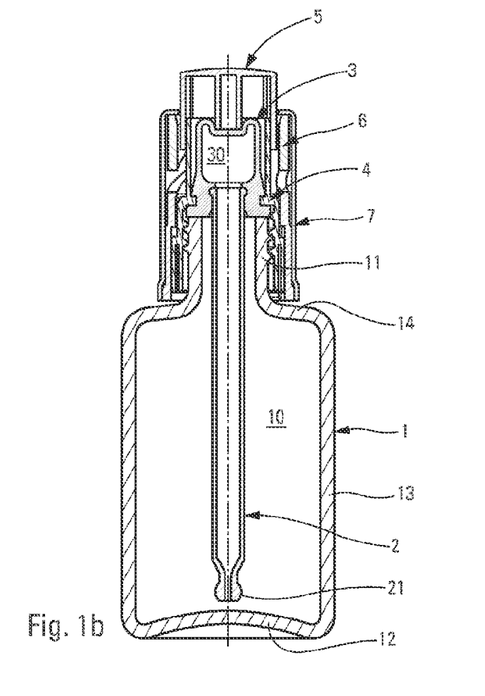

Reference is made firstly to FIGS. 1a and 1b in order to describe the general structure of a drop dispenser in a non-limiting embodiment of the invention. The drop dispenser comprises seven component elements, namely a fluid reservoir 1, a tube 2, a flexible part 3, a fastener ring 4, a pusher 5, a bushing 6, and a covering hoop 7. The drop dispenser may be divided into two sub-assemblies, namely a first sub-assembly constituted by the reservoir 1, and a second sub-assembly constituted by the component elements 2, 3, 4, 5, 6, and 7 and forming a dispenser head. The dispenser head is mounted in removable manner on the reservoir by screw-tightening and loosening. The tube 2 extends inside the reservoir by being mounted on the flexible part 3 that is engaged with the fastener ring 4 that is fastened on the reservoir. The pusher 5 is mounted on the fastener ring 4 in movable manner so as to deform the flexible part 4. The bushing 6 is engaged with the ring 4 and co-operates with the pusher 5 so as to move it between a low position shown in FIG. 1a and a high position shown in FIG. 1b. The covering hoop 7 has an appearance function only and could therefore be omitted.

The fluid reservoir 1 may be entirely conventional and includes a threaded neck 11 that projects upwards from a shoulder 14. The reservoir 1 also includes a bottom wall 12 and a side wall 13 that internally define a working volume 10 for filling, at least in part, with fluid. The shape and the constituent material of the reservoir are not critical for the present invention: it suffices that the reservoir includes an externally threaded neck, like the neck 11.

Reference is made below to FIGS. 2, 4, 6, and 7 in order to describe in detail the fine structure of the dispenser head of the drop dispenser of the invention.

The tube 2 may be made of any appropriate material, such as glass, plastics material, metal, etc. The tube 2 includes a dispenser end 21 that forms a dispenser duct 22 of small section. The dispenser end 21 is designed so as to enable drops to form, and so as to hold fluid inside the tube by capillarity. The dispenser end 21 and the rest of the tube 2 may present a structure that is conventional for a drop dispenser. The tube 2 also includes a top actuation end 23 that defines a wide opening.

The flexible part 3 may be referred to as a squeeze bulb that defines a fluid chamber 30 of volume that varies by deforming the flexible part. More precisely, the flexible part 3 comprises: an incorporated neck gasket 31 for bearing in flattened manner against the threaded neck 11 of the reservoir; a first reception housing 34 for receiving the fastener ring 4; a second reception housing 33 for receiving the actuation end 23 of the tube 2; a chamber outlet 32 that communicates directly with the tube 2; and a movable wall 35 that moves by deforming the flexible part 3. The part 3 thus defines a fluid chamber 30 of variable volume that communicates with the tube 2 through the outlet 32. By moving the wall 35, the volume of the chamber 30 varies from a minimum to a maximum, as shown in FIGS. 1a and 1b respectively.

The fastener ring 4 includes a threaded skirt 41 for coming into threaded engagement with the threaded neck 11 of the reservoir, as can be seen in FIGS. 1a and 1b. The threaded skirt 41 is provided externally with two tabs 42 that extend upwards and that are clearly visible in FIG. 6. The two tabs 42 co-operate with the bushing 6, as described below. Above the threaded skirt 41, the ring 4 forms a flange 43 that is received in the first reception housing 34 of the flexible part 3. By way of example, the flange 43 may be snap-fastened in the housing 34. Above the flange 43, the ring 4 forms a substantially-cylindrical collar 44 in which there extends a major fraction of the flexible part 3. The collar 44 forms three axial splines 45 on its outer wall. The splines co-operate with the pusher 5, as described below.

The pusher 5 includes a top bearing surface 51 on which the user may press by means of one or more fingers. On its outer periphery, the bearing surface 51 is extended downwards by a substantially-cylindrical casing 52 that extends around the collar 44 of the ring 4. In order to co-operate with the axial splines 45 of the collar 44, the inner wall of the casing 52 is provided with three axial grooves 54 in which the axial splines 45 are engaged, as can be seen in the section views of FIGS. 3a and 5a. The mutual engagement of the splines 45 and grooves 54 leads to the pusher being guided axially on the ring, without allowing any mutual turning movement. In other words, the pusher 5 can slide axially on the ring 4 while being prevented from turning. The pusher 5 is guided to move axially between the low and high positions shown in FIGS. 1a and 1b. The pusher 5 also includes an actuator rod 53 that comes into engagement with the movable wall 35 of the flexible part 3. The rod projects downwards from the bearing surface 51 and moves the movable wall 35 while deforming the flexible part 3, as can be seen by comparing FIGS. 1a and 1b. In the invention, the pusher 5 also includes two cam lugs 56 that project outwards in diametrally-opposite manner from the cylindrical casing 52. The cam lugs 56 are formed in the proximity of the bottom edge of the casing 52, as can be seen in the figures.

Figures 2, 3A, 3B:
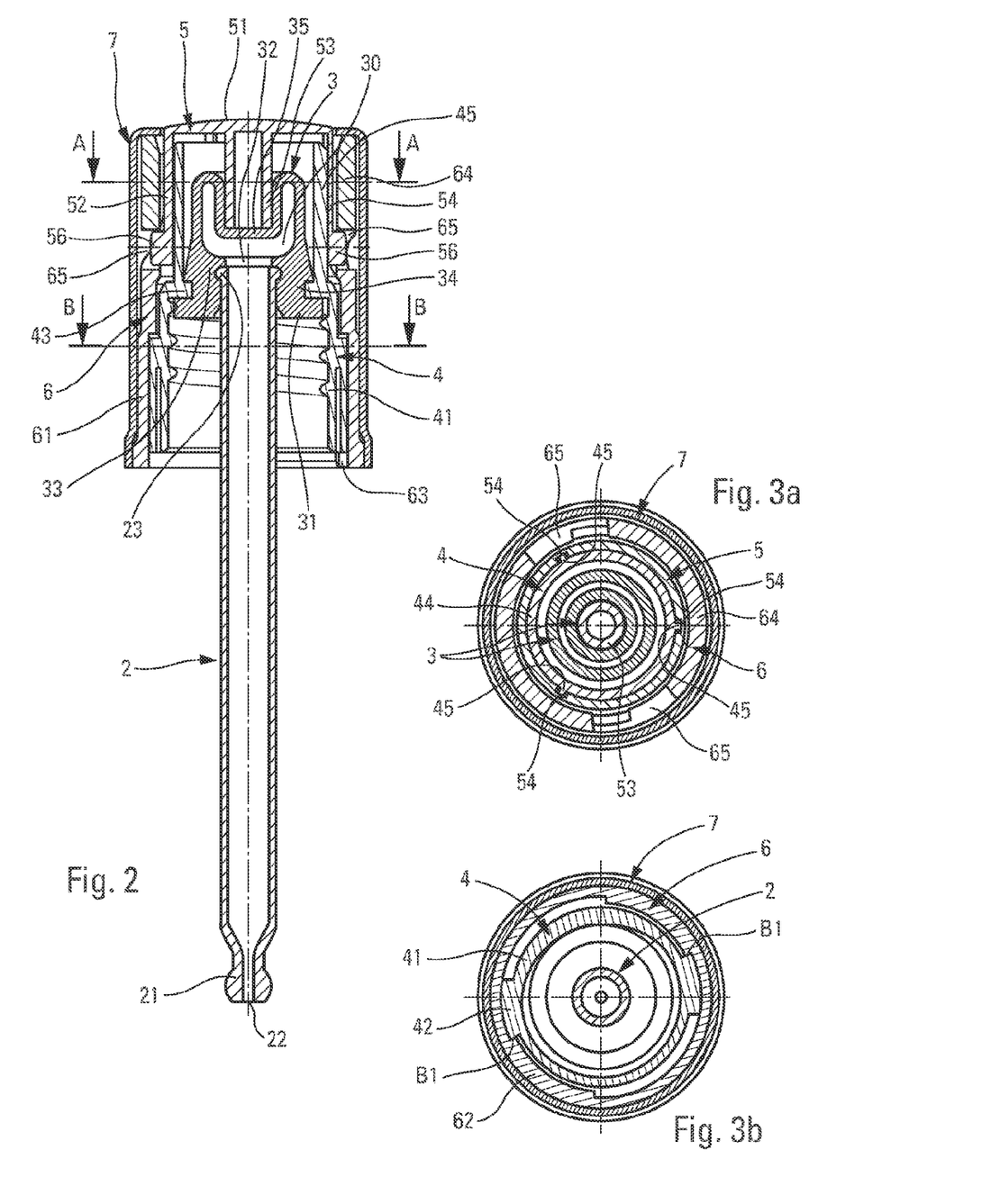
FIG. 2 is a larger-scale section view of the FIG. 1a dispenser, without the reservoir.
FIGS. 3a and 3b are horizontal section views on section lines A-A and B-B of FIG. 2.
Figures 4, 5A, 5B:
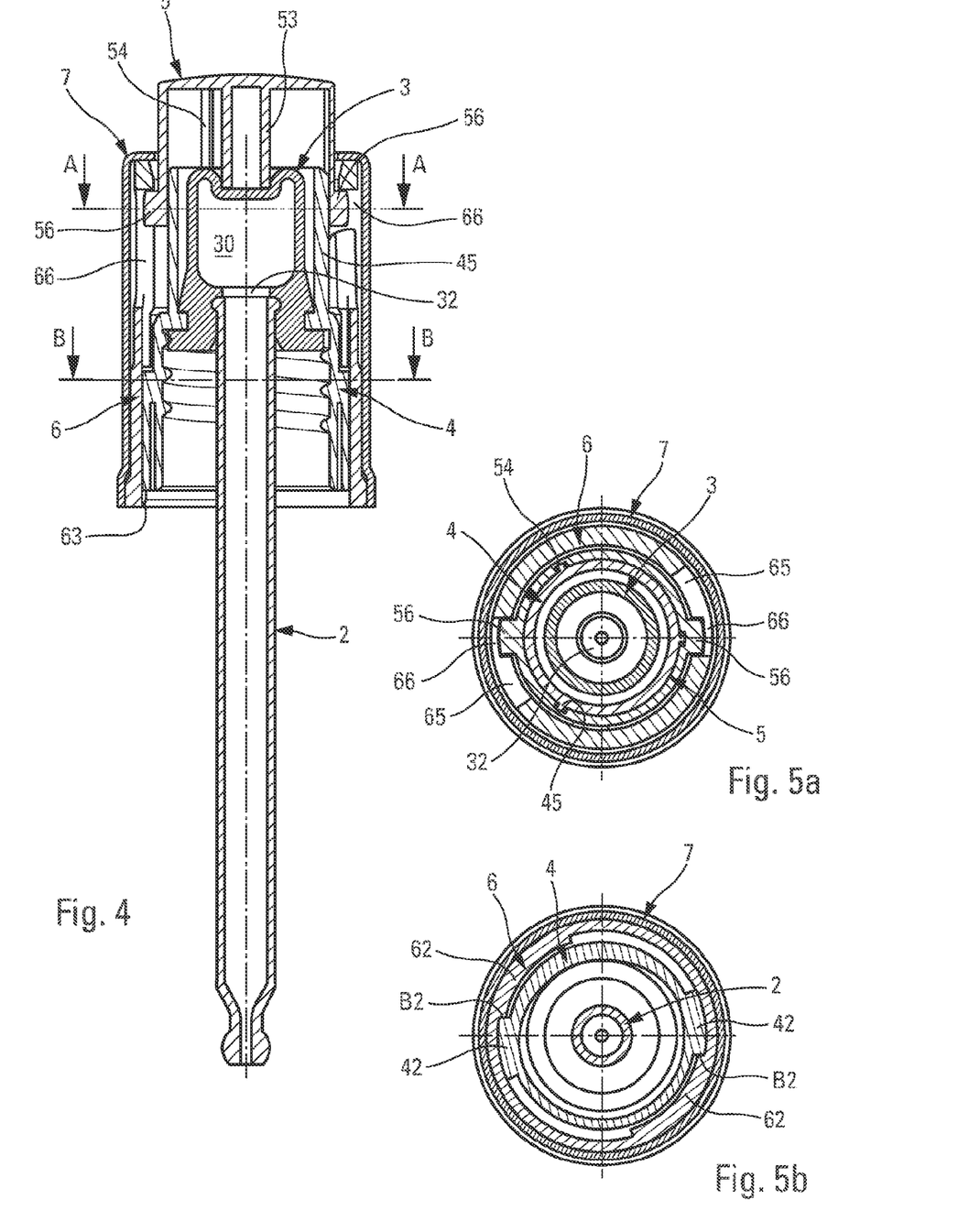
FIG. 4 is a larger-scale view of FIG. 1b, without the reservoir.
FIGS. 5a and 5b are horizontal section views along lines A-A and B-B of FIG. 4.

The bushing 6 is engaged around the fastener ring 4 and the pusher 5. It can also be said that the casing 52 of the pusher 5 extends between the collar 44 and the bushing 6. The bushing includes a bottom portion 61 that is engaged around the threaded skirt 41 in rotary manner for turning over a limited angular stroke. By way of example, the bottom portion 61 may form snap-fastener sectors 63 for loose engagement below the threaded skirt 41. Thus, the bushing 6 can turn freely around the fastener ring 4 over a limited stroke. In order to limit the angular stroke, the bushing 6 internally forms two extra thicknesses 62 that are arranged in diametrally-opposite manner. One of the sectors is very visible in FIG. 6. The two sectors are also visible in FIGS. 3b and 5b. In the invention, the two tabs 42 of the fastener ring 4 are arranged between the two extra thicknesses 62 of the bushing 6, such that the tabs 42 can move over a limited angular stroke between the two extra thicknesses 62. Each end of the angular stroke forms two abutments B1, B2, as can be seen in FIGS. 3b and 5b. The angular abutments B1 in FIG. 3b are tightening abutments that enable the bushing 6 to drive the ring 4 in the tightening direction, while the abutments B2 in FIG. 5b are loosening abutments that enable the bushing 6 to drive the ring 4 in the loosening direction. The bushing 6 is thus turns freely on the ring 4 over a limited angular stroke that may correspond to 90°, for example.

Figure 6:
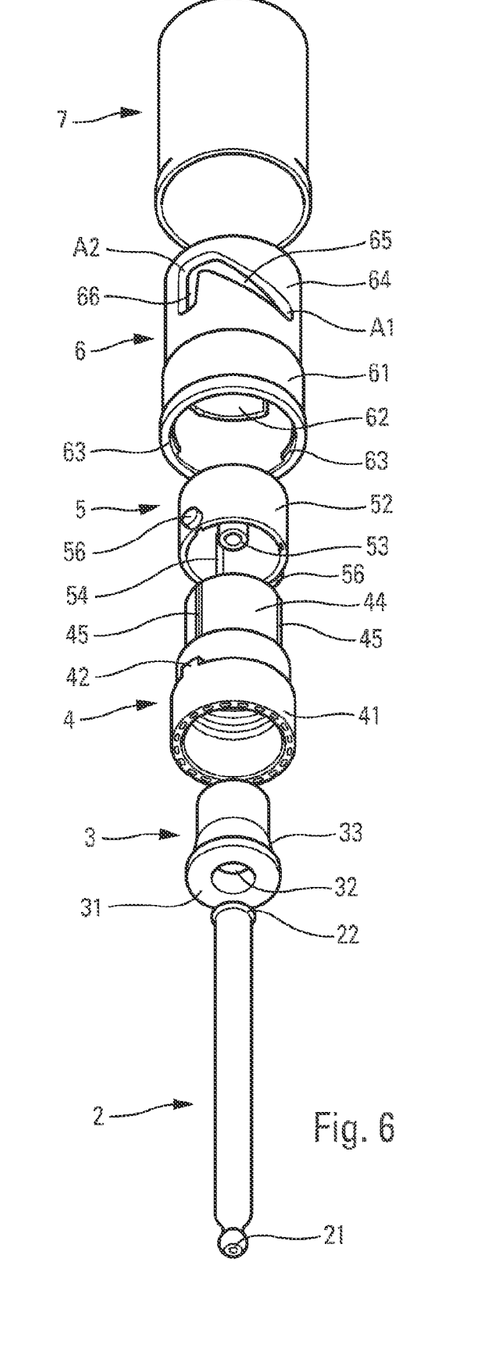
FIG. 6 is an exploded perspective view of the dispenser of the above figures, without the reservoir.
Figure 7:
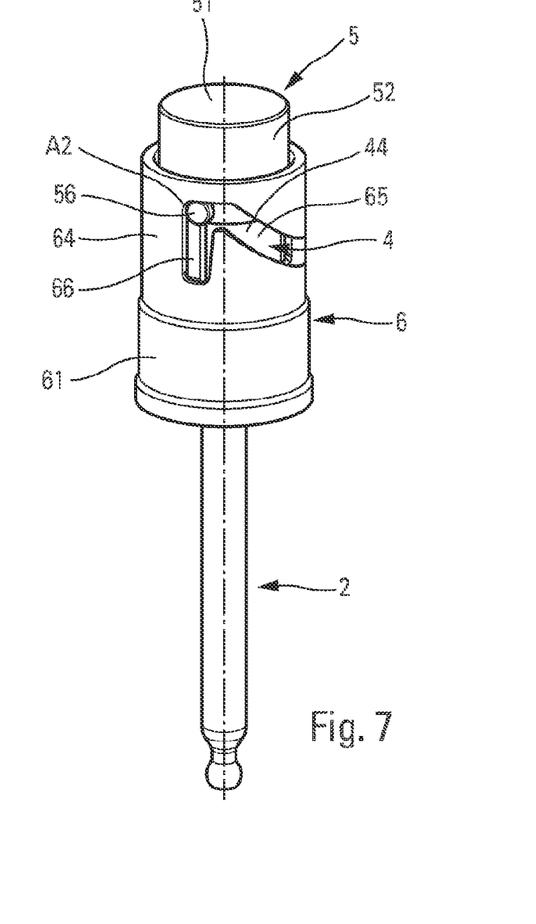
FIG. 7 is a perspective view of the dispenser of the above figures, shown in the mounted state and without the reservoir.

The bushing 6 also includes a top portion 64 that forms two cam paths 65 that are connected to two actuation chimneys 66, as can be seen in FIGS. 6 and 7. More precisely, each cam path 65 defines a low axial end A1 and a high axial end A2 from which the axial chimney 66 extends downwards. The cam paths 65 and the chimneys 66 may be formed only in the inside of the top portion 64 of the bushing, or, in a variant, they may pass through the wall thickness of the bushing, as in the figures. In the invention, each cam lug 56 of the pusher 5 is engaged in a respective cam path 65 and chimney 66. In the low position of the pusher 5, the two cam lugs 56 are situated at the low axial ends A1, and in the high position of the pusher, the two cam lugs 56 are situated at the high axial ends A2, as can be seen in FIG. 7. In the high position of the pusher, it should easily be understood that the pusher may be depressed axially, given that the cam lugs 56 can then move axially in the axial chimneys 66 over a limited axial stroke. Given that the pusher 5 is prevented from turning relative to the ring 4 as a result of the grooves and axial splines 45, 54 being interleaved, the pusher 5 is constrained to move axially when the bushing 6 is caused to turn relative to the ring 4. The cam lugs 56 are thus constrained to move along the cam paths 65 between the low and high axial ends A1, A2. The movement of the lugs 56 in the cam paths 65 corresponds to a limited angular stroke that corresponds to the limited angular stroke defined by the abutments B1 and B2 where the tabs 42 co-operate with the extra thicknesses 62. By way of example, provision may be made for the cam lugs 56 to be positioned at the high axial ends A2 of the cam paths 65 when the abutments B2 are engaged. It is not necessary for the lugs 56 to come into bearing contact with the high axial ends A2, it being possible for the torque exerted on the bushing 6 to be withstood entirely by the abutments B2. In a variant, provision can also be made for there to be no tabs 42 and no extra thicknesses 62, such that there are no abutments between the bushing 6 and the ring 4. In this configuration, the torque exerted on the bushing 6 is withstood entirely by the lugs 56 in bearing contact against the high axial ends A2. The same applies for the low axial end A1 that corresponds to the abutments B1 in FIG. 3b. It should easily be understood that the abutments B1 and B2 have the sole purpose of transmitting the torque from the bushing 6 directly to the ring 4, without passing via the pusher 5. However, it is possible to provide a variant that uses the pusher 5 as torque transmitter. Provision could thus be made to reinforce the lugs 56, the splines 45, and the grooves 54.

Thus, the bushing 6 constitutes mover means that make it possible not only to cause the ring 4 to turn so as to screw-tighten it on the neck 11 and to loosen it therefrom, but also to move the pusher 5 axially, which pusher is prevented from turning on the ring 4. The pusher 5 moves axially over the limited angular stroke between the bushing 6 and the ring 4. The angular stroke may be limited either by the abutments B1, B2, or by the axial ends A1 A2, or by a combination of both.

The covering hoop 7 makes it possible to cover the bushing 6 that is not very attractive with its cam paths 65 and its chimneys 66. The covering hoop 7 is mounted in stationary manner on the bushing 6, e.g. by clamping and/or by means of inner fastener profiles. By way of example, the hoop 7 may be made of metal for appearance reasons. It defines an inwardly-directed rim that forms an opening through which the pusher 5 extends.

Reference is made below to all of the figures while describing a complete working cycle of the drop dispenser of the invention from the low position of the pusher 5 when the dispenser head is in place on the reservoir, as shown in FIG. 1a. This position corresponds to the end of a tightening operation for tightening the ring 4 on the threaded neck 11. The pusher 5 is in its low position: the cam lugs 56 are arranged at the low axial ends A1. The tabs 42 and the extra thicknesses 62 are in angular abutment B1, as can be seen in FIG. 3b. The fluid chamber 30 defines a minimum internal volume. The dispenser end 21 of the tube 2 is dipped in the fluid contained in the reservoir 1. The incorporated gasket 31 of the flexible part 3 is compressed as much as possible against the top annular edge of the neck 11, thereby generating large friction forces.

From this position that corresponds to the end of a tightening operation, the user begins to turn the bushing 6 by gripping the covering hoop 7.

The friction forces between the bushing 6 and the ring 4 are much smaller than the friction forces between the incorporated gasket 31 and the neck 11, such that the bushing 6 turns about its own axis without driving the ring 4. While the bushing is turning freely, the pusher 5 is caused to move axially from its low position to its high position, as shown in FIGS. 1b and 4. The cam lugs 56 have thus followed the entire cam path 65 so as to reach the high axial end A2. Simultaneously, the tabs 42 are moved between the extra thicknesses 62 so as to reach the other angular abutments B2, as shown in FIG. 5b. The cam lugs 56 and thus positioned vertically above the chimneys 66, as can be seen in FIGS. 4 and 5a.

Once the pusher 5 has reached its high position, the user feels a certain amount of resistance that corresponds to the friction forces due to the compression of the incorporated gasket 31 on the neck 11. By overcoming this resistance, the bushing 6 causes the ring 4 to turn in the loosening direction, the torque being transmitted at the abutments B2. The user may then finish off the loosening operation until the dispenser head is separated from the reservoir.

The user may then actuate the pusher 5 so as to dispense one or more drops of fluid. Once dispensing is terminated, the user once again positions the dispenser head on the reservoir for the purpose of tightening the ring 4 back on the threaded neck.

Two operating modes and thus possible. In a first operating mode, the friction forces during tightening are smaller than the friction forces generated during the axial movement of the pusher. The fastener ring 4 is then caused to turn by the bushing 6, while conserving the angular abutments B2. The tightening operation continues until the incorporated gasket 31 once again comes into contact with the annular edge of the threaded neck 11. The friction forces thus increase suddenly in such a manner as to exceed the friction forces generated during the axial movement of the pusher. The bushing 6 thus turns freely around the ring 4 over the limited angular stroke so as to move the pusher 5 into its low position. While the bushing 6 is turning freely on the ring 4, the cam lugs 56 move in the cam path so as to return to the low axial ends A1, and the tabs 42 move between the extra thicknesses 62 so as to reach the angular abutments B1. Turning the bushing 6 is then almost impossible, except to compress the incorporated gasket 31 a little bit more.

The second operation pre-supposes that the friction forces during tightening are larger than the friction forces associated with the axial movement of the pusher 5. The pusher is then moved axially towards its low position before the ring 4 is tightened back on the neck 11. Turning the bushing 6 thus has the immediate effect of moving it relative to the ring 4 over the limited angular stroke, during which stroke the pusher 5 returns to its low position. The cam lugs 56 are moved along the cam path towards the low axial ends A1, and the tabs 42 are moved relative to the extra thicknesses 62 so as to return to the angular abutments B1. From there, turning the bushing 6 causes the ring 4 to turn on the neck 11 in the tightening direction. At the end of tightening, the user feels resistance that corresponds to the flattening of the incorporated gasket 31 that marks the end of the tightening.

In the embodiment of the figures, the fluid chamber 30 is formed by a flexible part 3. In a variant, it is also possible to form a chamber of variable volume that includes a slide cylinder in which a piston slides, e.g. that is secured to the pusher 5. As already mentioned above, the angular abutments B1 and B2 are optional, but preferable. The neck gasket is incorporated with the flexible part 3, but it is also possible to envisage using a separate neck gasket. In this embodiment, the flexible part 3 and the pusher 5 are made from two separate parts, but it is also possible to envisage making the two parts as a single piece. The covering hoop 7 is an optional appearance part that could be omitted.

By means of the invention, merely tightening and loosening the ring 4 on the neck 11 of the reservoir also seems to cause the pusher 5 to move axially, thereby modifying the internal volume of the fluid chamber 30. In the rest and/or storage position, the ring 4 is fully tightened on the neck of the reservoir, with the pusher in its low position that defines a minimum volume for the fluid chamber. On loosening, the pusher moves into its high position, enabling the chamber to increase its internal volume, and to fill with a determined quantity of fluid. The user thus no longer needs to perform the prior operation of filling the fluid chamber before dispensing drops. The chamber is filled in automatic, accurate, and repetitive manner.

The invention claimed is:
1. A drop dispenser comprising:
a fluid reservoir having a threaded neck;
a tube having a dispenser end that is designed to form a drop of fluid, and an actuation end;
a fluid chamber of variable volume, connected to the actuation end of the tube, the chamber being suitable for being filled and emptied through the tube;

a pusher that is axially movable between a high position and a low position so as to cause the volume of the chamber to vary and drive the fluid into the tube towards the dispenser end so as to form a drop of fluid; and a fastener ring including a threaded skirt for coming into engagement with the threaded neck of the reservoir, the tube and the chamber being secured to the ring;

the drop dispenser further comprising mover means for moving the pusher axially between the high and low positions, the mover means also causing the fastener ring to turn, both so as to loosen it from the neck by unscrewing and so as to tighten it onto the neck by screw-tightening.

2. A drop dispenser according to claim 1, wherein the mover means move the pusher axially from the low position to the high position before the ring is loosened from the neck.

3. A drop dispenser according to claim 1, wherein the mover means are mounted to turn relative to the ring over a limited angular stroke over which the pusher is moved axially between the high and low positions by the mover means.

4. A drop dispenser according to claim 1, wherein the friction between the mover means and the ring is less than the friction between the ring and the neck, at least at the start of loosening.

5. A drop dispenser according to claim 1, wherein the pusher is guided axially relative to the ring while being prevented from turning relative to the ring.

6. A drop dispenser according to claim 5, wherein, in its high position, the pusher causes the ring to turn so as to loosen it from the neck, and in its high or low position the pusher causes the ring to turn so as to tighten it on the neck.

7. A drop dispenser according to claim 3, wherein the ring and the mover means co-operate with each other to define two angular abutments that define the angular stroke, namely a loosening abutment for driving the ring in the loosening direction while the pusher is already in its high position, and a tightening abutment that is reached when the pusher returns to its low position.

8. A drop dispenser according to claim 1, wherein the mover means comprise a generally cylindrical bushing that is mounted to turn on the fastener ring over a limited angular stroke, the bushing forming at least one cam path that defines two offset axial ends, the pusher being prevented from turning on the ring and including at least one cam lug that is engaged with the cam path of the bushing, such that turning the bushing relative to the ring causes the cam lug of the pusher to move along the cam path of the bushing between its two axial ends.

9. A drop dispenser according to claim 8, wherein the bushing extends around the ring and the pusher, the ring and the bushing co-operating with each other to define two angular abutments that limit the angular stroke, the two abutments corresponding substantially to the high and low positions of the pusher, respectively at the start of loosening the ring from the neck, and at the beginning or the end of tightening the ring on the neck.

10. A drop dispenser according to claim 9, wherein the bushing is snap-fastened on the ring while being free to turn about its own axis over an angular stroke that is limited by the angular abutments.

11. A drop dispenser according to claim 8, wherein the fastener ring includes a top axial guidance collar that is in axial sliding engagement with the pusher, the bushing comprising a bottom portion that is snap-fastened on the skirt while being free to turn about its own axis over the limited angular stroke, and a top portion that forms said at least one cam path in which the cam lugs of the pusher are engaged.

12. A drop dispenser according to claim 1, wherein the fluid chamber is formed with a flexible part that is deformed by the pusher between the high and low positions, the flexible part advantageously being mounted in the fastener ring.

* * * * *